United States Patent Office 3,443,582
Patented May 13, 1969

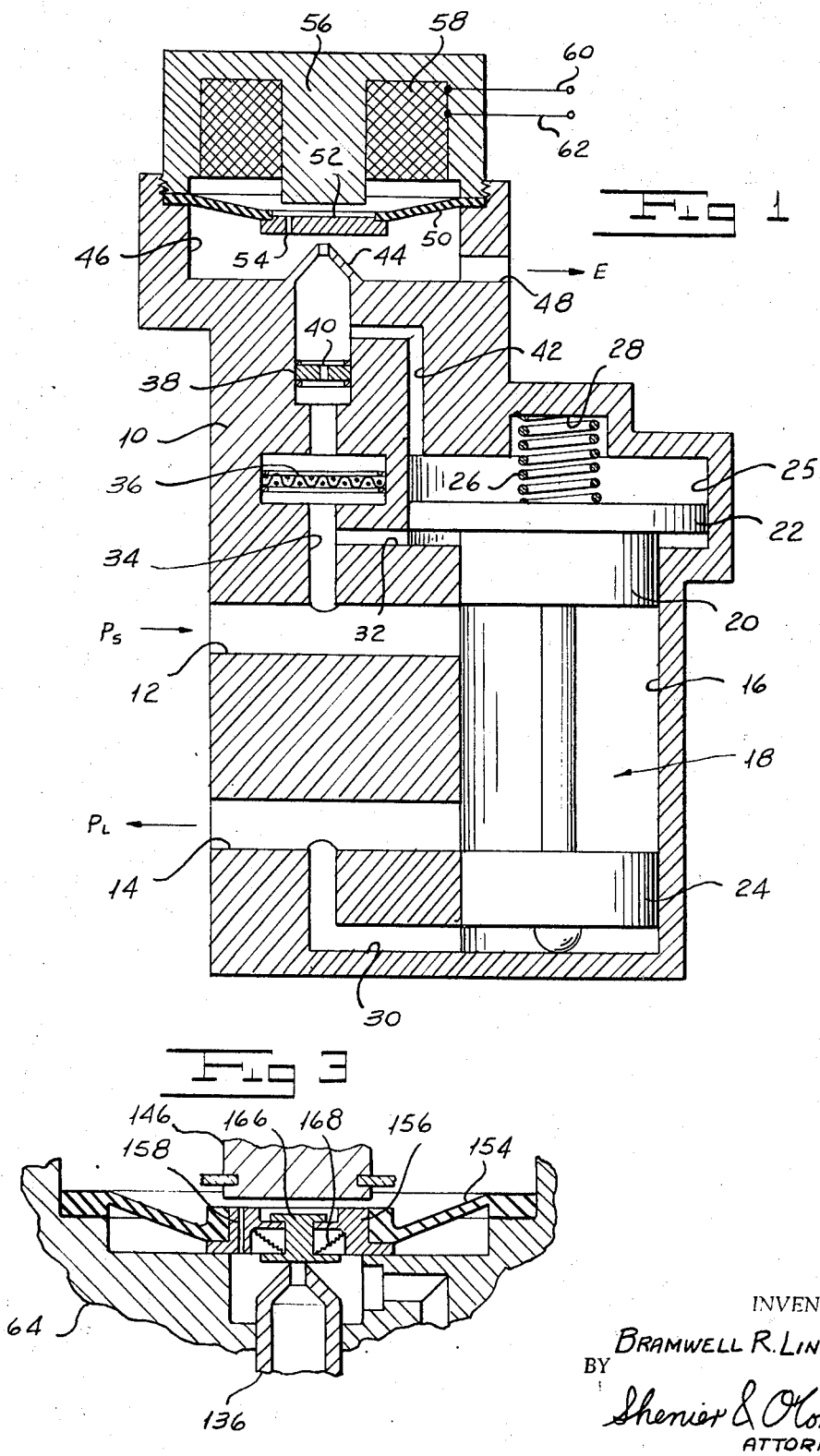

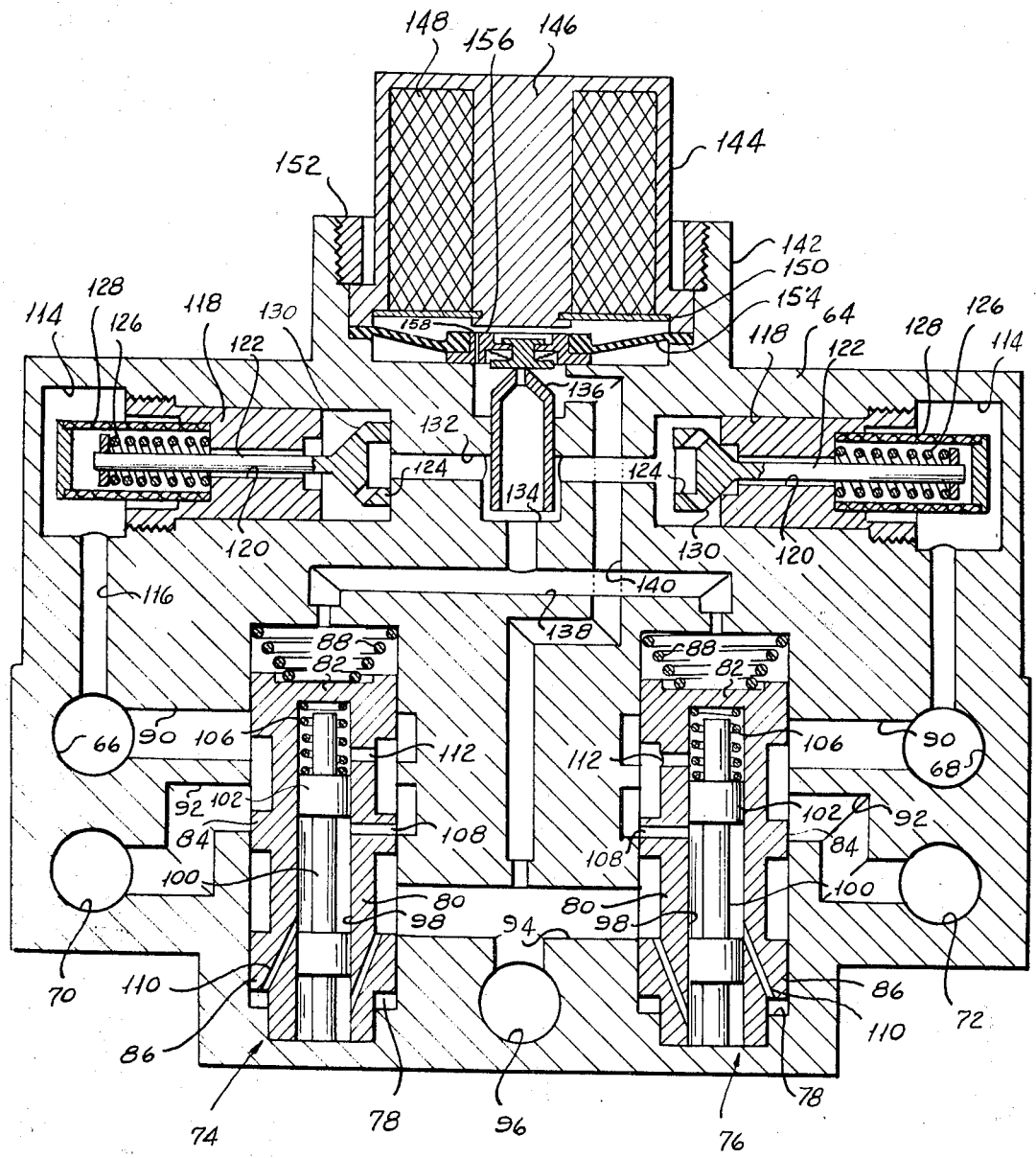

3,443,582
PRESSURE CONTROL VALVE
Bramwell R. Linden, Port Chester, N.Y., assignor to Ozone Metal Products Corporation, Ozone Park, N.Y., a corporation of New York
Continuation of application Ser. No. 367,041, May 13, 1964. This application Mar. 30, 1966, Ser. No. 538,868
Int. Cl. B60t *11/34;* G05d *7/06, 16/20*
U.S. Cl. 137—495                        4 Claims This application is a continuation of my copending application Ser. No. 367,041, filed May 13, 1964, now abandoned.

My invention relates to an improved pressure control valve and more particularly to a pressure control valve for maintaining a constant difference between two variable pressures.

There are known in the prior art various devices adapted to maintain a constant regulated pressure from a nominally constant pressure source. Devices of this nature may act through a spring loaded valve having known characteristics or alternatively some type feedback system could be employed to maintain the desired pressure.

There are many instances in which rather than merely maintaining a constant regulated pressure from a source, it is desired to maintain a constant difference between two variable pressures. One particular example of a system in which this is a requirement is in braking systems for aircraft or the like in which braking force on a wheel is to be reduced to avoid skidding. It might be possible to devise a system for maintaining a constant difference by employing two individual regulators of the type known in the prior art, feeding the regulated outputs to a comparator and applying the comparator output to one of the regulating devices to maintain the desired difference. Such a system, however, embodies a number of disadvantages. First, it is relatively complicated for the result achieved thereby. Secondly, owing to the fact that both the pressures may vary over a relatively wide range, the regulating devices would be required to operate over a much greater range than that for which they are designed.

The copending application of Walter A. Hickox, Ser. No. 363,415, filed Apr. 29, 1964, now Patent No. 3,384,-102, for a "Pressure Control Valve," discloses a device which is capable of maintaining a constant difference between two variable pressures. While the system shown in the Hickox application successfully achieves its purpose of maintaining a constant difference between two pressures, the control signal which operates the pilot valve to provide the difference is required to act against the source pressure. Consequently, it is relatively insensitive and a large force and signal are required to provide control.

I have invented an improved pressure control valve for maintaining a constant difference between two variable pressures. My valve has greater control sensitivity than systems heretofore proposed. I provide my valve with hydraulic amplification of the control signal so that only a relatively small signal is required to initiate a control operation. My system has no friction or hysteresis in its first hydraulic stage.

One object of my invention is to provide an improved pressure control valve for maintaining a constant difference between two pressures.

Another object of my invention is to provide an improved pressure control valve which is more sensitive than are valves heretofore proposed.

A further object of my invention is to provide an improved pressure control valve which requires only a relatively low level signal for its operation.

Another object of my invention is to provide an improved pressure control valve wherein the control signal is hydraulically amplified.

A still further object of my invention is to provide an improved pressure control valve wherein there is substantially no friction or hysteresis in the first hydraulic stage.

Other and further objects of my invention will appear from the following description.

In general my invention contemplates the provision of an improved pressure control valve comprising a normally balanced system wherein fluid at supply pressure flows through an orifice to provide a control pressure acting on a valve control area against the aggregate of the supply pressure acting on a feedback area and the load pressure acting on a load area. In response to a control signal a flapper moves away from a nozzle to bleed fluid from the control pressure region to cause the valve to move in a direction to reduce load pressure.

In the accompanying drawings which form part of the instant specification and which are to be read in conjunction therewith and in which like reference numerals are used to indicate like parts in the various views:

FIGURE 1 is a schematic view of one form of my improved pressure control valve illustrating the principles thereof.

FIGURE 2 is a sectional view of another form of my improved pressure control valve.

FIGURE 3 is an enlarged fragmentary view of a portion of the form of my control valve shown in FIGURE 2.

Referring now to FIGURE 1 of the drawings, the form of my valve shown therein includes a housing 10 provided with a supply line 12 leading from a pressure source and a load line 14 leading to the device to which fluid under pressure is to be applied. Housing 10 has a valve chamber 16 which slidably receives a valve indicated generally by the reference character 18 having an upper head 20 formed with a peripheral flange 22 and having a lower head 24. The flange 22 is adapted to slide in an enlarged portion 25 of the housing 16. I dispose a spring 26 between the top of a recess 28 in housing 16 and the head 20 normally to urge the valve 18 to move downwardly as viewed in FIGURE 1.

Both the supply line 12 and the load line 14 lead into the space between the heads 20 and 24 in the normal position of the valve 18. A passage 30 leads from the line 14 to the underside of the lower head 24 to apply load pressure to the underside of the head 24. Passages 32 and 34 lead from the supply line 12 to the space below the flange 22 to apply the supply pressure thereto. For purposes of convenience in explanation, I have designated the supply pressure as $P_S$ and the load pressure as $P_L$. The area of the underside of the head 24 may be termed the load area $A_L$ while the area on the underside of the flange 22 may be termed the bias or supply area $A_S$. From the structure just described, it will be apparent that the valve 18 normally is urged to move upwardly as viewed in FIGURE 1 by a force equal to $P_L A_L + P_S A_S$.

Passage 34 leads from the supply line 12 through a filter 36 to a member 38 having a restricted orifice 40 therein. A passage 42 leads from the region beyond the orifice 40 to the chamber 25. It will readily be apparent that if some flow is permitted through the orifice 40, there will be a pressure drop across the orifice in the direction of the flow. For purposes of exposition, I have termed the pressure beyond the orifice and that applied to the upper surface of the flanged head as $P_C$ and have designated the area to which it is applied as $A_C$. It will thus be apparent that a force $P_C A_C$, plus the force of the spring 26, if provided, tends to move the valve 18 downwardly as viewed in FIGURE 1.

A nozzle 44 connects the region beyond the orifice 40 to a chamber 46 having a port 48 leading to the exhaust. A resilient diaphragm 50 supported within the chamber 46 carries a flapper 52 formed of magnetic material. Diaphragm 50 supports the flapper 52 for movement with relation to the nozzle 44 from a normal position at which it closes the nozzle opening to a position away from the nozzle. It will readily be appreciated by those skilled in the art that the distance of the diaphragm 50 from the nozzle determines the magnitude of the pressure drop across the member 38. A small opening 54 in the flapper 52 permits some of the hydraulic fluid to flow into the portion of the chamber 46 above the diaphragm to provide a damping force on the system.

A magnetic pole 56 over the chamber carries a winding 58 adapted to be supplied with a control current through conductors 60 and 62 to produce a flux which attracts the flapper 52 to move it away from nozzle 44 when a control operation is to be initiated. Any suitable sealing means may be provided to protect winding 58 against the effect of the hydraulic fluid.

In the configuration shown in FIGURE 1, assume that no control current is applied to conductors 60 and 62 so that flapper 52 restricts the opening of nozzle 44. This is the condition which I select for the maximum $P_S$. Under these conditions there is minimum flow through the orifice 40 such that $P_C=P_S$. At the same time valve 18 is in its lowermost position and $P_S=P_L$. The pressure $P_CA_C$ is balanced by the sum of the forces $P_SA_S$ and $P_LA_L$. Under these conditions it will readily be apparent that the area $A_C$ is equal to the sum of the areas $A_S$ and $A_L$.

If now a signal is applied to the conductors 60 and 62 to initiate a control operation, then flapper 52 moves away from the nozzle 44 to permit some flow through the nozzle to the exhaust through port 48. Owing to the flow through the nozzle there is a pressure drop across the restricted orifice 40 and the control pressure $P_C$ is reduced. Thus the force tending to move the valve 18 downwardly is reduced while the forces tending to move the valve upwardly remain the same. Consequently, valve 18 moves upwardly slightly and head 24 begins to close the load line thus to reduce load pressure. This operation of course results in a lowering of the force $P_LA_L$ tending to move valve 18 upwardly. Ultimately a balanced condition results and the load pressure has been reduced by the amount determined by the signal applied to conductors 60 and 62.

The condition just described is one in which no "fail safe" spring 26 is provided. Assuming that such a spring is employed, a very slight flow is permitted through the nozzle 44 under no-signal conditions so that, for example, $P_C=0.99P_S$. Then the pressure relationship will be:

(1) $$0.99P_SA_C+F_C=A_SP_s+A_LP_L$$

where $F_C$ is the spring force. Since supply pressure is equal to load pressure and since the control area $A_C$ is equal to the sum of $A_S$ and $A_L$ it can be demonstrated that (2) $$F_C=0.01P_SA_C$$

As will be pointed out more fully hereinafter, it may be desirable at the maximum $P_S$ to have the control pressure $P_C$ be a given percentage such, for example, as 80 percent supply pressure. It will readily be apparent that under such conditions, with no signal $P_S=P_L$. If such a condition is selected, the pressure relationships are:

(3) $$0.8P_SA_C=P_SA_s+P_LA_L$$

However, we known that $P_L=P_S$ so that (4) $$0.8P_SA_C=P_S(A_s+A_L)$$

and (5) $$A_S+A_L=0.8A_C$$

This of course is not the case in the example of my valve shown in FIGURE 1. If these conditions are to be met, the valve must be redesigned to provide the area relationship set forth in Equation 4. It will be apparent that in any event, the initial conditions are determined for the maximum supply pressure to be encountered. If the control pressure is less than maximum pressure under the initial conditions, a supply pressure less than that maximum will cause some slight delay in the operation of the valve.

Once having determined the relationship between the sum of the bias and load pressure areas and the control area, it remains to determine the ratio of the feedback area $A_S$ to the control area $A_C$. It can readily be demonstrated that the control pressure cannot be reduced to zero. This is self evident from the fact that even with the flapper 52 at an infinite distance from the nozzle 44, there will be some drop across the nozzle. At the limiting conditions $P_L$ is zero and consequently:

(6) $$P_{C\ min}A_C=P_SA_S$$

therefore, (7) $$A_S/A_C=P_{C\ min}/P_S$$

Referring now to FIGURES 2 and 3, I have shown a practical embodiment of my improved pressure control valve wherein the control area $A_C$ is not equal to the sum of the biasing or supply area $A_S$ and the load area $A_L$ as is the usual case. Moreover, in FIGURES 2 and 3 I have shown an arrangement wherein two control valves are actuated by a common control. It will readily be understood that a multiplicity of control valves can be made responsive to a single control flapper valve. A specific instance in which such a system might be used is one in which one input signal has to control two or more wheel brakes in an antiskid system.

The housing 64 of the form of my valve shown in FIGURE 2 has respective supply lines 66 and 68 adapted to supply fluid under pressure to load lines 70 and 72. The supply of fluid from the line 66 to the line 70 is controlled by one of my improved pressure control valves indicated generally by the reference character 74 while the supply of fluid from line 68 to line 72 is controlled by another pressure control valve indicated generally by the reference character 76. Since the valves 74 and 76 are substantially the same in construction, for simplicity, I will describe in detail only the valve 74. A valve chamber 78 in the housing 64 slidably receives a main spool 80 having an upper cylinder 82, a central cylinder 84 and lower cylinder 86. A low load fail safe compresion spring 88 normally urges the spool 80 to the lowermost position in FIGURE 2. In this position of the spool, fluid under pressure flows from line 66 through a passage 90 leading to the chamber 78 through the space between cylinders 82 and 84 and through a passage 92 to the load line 70. A passage 94 connects the space between cylinders 84 and 86 to a common exhaust or return pressure line 96. A central bore 98 in the spool 80 receives a stationary biasing spool 100 having an upper head 102 and a lower head 104. A spring 106 is biased between the upper end of the bore 98 and the upper head 102. A radial passage 108 in the cylinder 84 leads into the bore 98 and a passage 110 connects the portion of the bore between heads 102 and 104 to the space between the bottom of the chamber 78 and the lower head 86. In this manner load pressure is applied to an annular portion of the underside of cylinder 86 over an area $A_L$. Another radial passage 112 permits the flow of fluid at supply pressure into the bore 98 over the cylinder 102 to apply this pressure to the upper end of the bore over an area $A_S$.

A chamber 114 connected to supply line 66 by a passage 116 receives an orifice-forming member 118 having an orifice 120 therein. Orifice 120 slidably receives the shank 122 of a poppet valve 124 normally urged by a spring 126 to a position at which the valve closes the orifice. Fluid under pressure flowing into the chamber 114 passes through a woven filter 128 and through the orifice 120. Normally this fluid forces the valve 124 to the right as viewed in FIGURE 2 until it butts the end of chamber 114 and the fluid then flows through a passage 130 in the valve and into a passage 132. It will readily be appreciated from the arrangement described hereinabove in connection with FIGURE 1 that the pressure existing in passage 132 is the control pressure. Passage 132 leads into a chamber 134 in which I dispose the nozzle 136 of the system. A passage 138 connects chamber 134 to chamber 78 above the cylinder 82 so that the control pressure acts on the entire area $A_C$ of the cylinder 82. It will readily be appreciated that the area $A_C$ of the valve 74 is greater than the sum of the areas $A_L$ and $A_S$.

A passage 140 connects the outlet of nozzle 136 to the common return line 96. I so arrange the form of my valve shown in FIGURES 2 and 3 that the opening of the nozzle 136 normally is closed. An annular boss 142 on the housing 64 receives a winding housing 144 having a central pole 146 carrying a winding 148. Any suitable sealing means 150 protects the winding 148 from the effects of the hydraulic fluid. A ring 152 threaded into the boss 142 holds housing 144 in position on the housing 64. A diaphragm 154 clamped between the housing 144 and the housing 64 supports the main armature or flange 156 of this form of my valve. The arrangement is such that in response to energization of the winding 148, armature 156 will be lifted from the position shown in FIGURES 2 and 3. A bore 158 in the armature permits the flow of fluid therethrough to provide a damping force. It is necessary that in the absence of any signal there be no leakage out through the nozzle 136 in response to the supply pressure. It is also desirable that a very small signal to winding 148 be able to initiate a control opeartion. Of course, I could position the relatively heavy diaphragm 154 so that it closed the nozzle 136 with a relatively large force in the absence of a control signal. The difficulty with such an arrangement is that the system would then have considerable hysteresis and a large electrical signal would be required to initiate control and control sensitivity after initiation would be lost. Owing to the relatively heavy nature of the diaphragm 154, providing the critical adjusting just described by adjustment of this diaphragm is substantially impracticable. It is for this reason that I have provided this embodiment of my invention with an auxiliary armature 166 carried for limited sliding movement in the armature 156. A relatively light diaphragm 168 disposed between the main armature 156 and the auxiliary armature or flapper 166 normally positions the latter positively to close the nozzle in the absence of any signal. While the auxiliary armature or flapper 166 positively closes the nozzle opening, diaphragm 168 has a relatively light spring action so that the arrangement has low hysteresis. For example, as described hereinabove, it may be so arranged as to provide a control pressure $P_C$ which is 80 percent of supply pressure.

With the arrangement described above, the initial energization of winding 148 moves the auxiliary armature 166 away from the nozzle 136 and the control pressure drops sharply to 80 per cent of the supply pressure. Under these conditions, if the control area $A_C$ were equal to the sum of the supply area $A_S$ and the load area $A_L$, then the sharp drop in control pressure would at once produce a sharp drop in load pressure to reduce the braking force so quickly as to be undesirable. In order to avoid this result, as is described hereinabove, I so construct the valve 74 that the sum of the supply area and the load area is the same precentage of the control area as is the control pressure of the supply pressure when the auxiliary armature 166 is operated.

In operation of the form of my invention shown in FIGURE 1, with supply pressure $P_S$ equal to the load pressure $P_L$ and in the absence of any signal to the winding 58, flapper 52 closes the nozzle 44 so that the control pressure is equal to the supply pressures. With this arrangement, since the control pressure area is equal to the sum of the load area and the supply area, valve 18 occupies its neutral position. If, now, a signal to winding 58 indicates that the load pressure is too great, flapper 52 moves away from nozzle 44 to bleed off a certain amount of the control pressure. Under these conditions, valve 18 moves upwardly and the load pressure is reduced until the condition is reestablished that $P_C A_C = P_S A_S + P_L A_L$. This condition exists until the signal disappears, at which time flapper 52 closes the nozzle 44 and $P_C$ again builds up until it is equal to $P_S$ so that valve 18 moves downwardly to reestablish $P_L$.

If desirable, the arrangement can be provided with the "fail safe spring" 26 so that valve 18 normally is urged to the position shown in FIGURE 1 and a minute bleed-off of control pressure exists in the neutral position of the valve.

In operation of the form of my invention shown in FIGURE 2, with supply pressure equal to load pressure and in the absence of any signal on winding 148, the auxiliary flapper 166 closes the nozzle. Now, if a signal indicates that $P_L$ is too large, armature 166 quickly moves away from the nozzle opening to drop $P_C$ rapidly to a value of $0.8P_L$. Owing to the fact, however, that $A_C = 1.25(A_S + A_L)$ the system is still in balance. A slight increase in the signal will then move the main armature or flapper 156 to cause a further drop in $P_C$. Under these conditions, valve 74 moves upwardly under the influence of $P_S A_S + P_L A_L$ until a relationship is established at which $P_C A_C = P_S A_S + P_L A_L$. These conditions are maintained until the signal to winding 148 drops to a point at which armature 156 is dropped to its neutral position. As the armature 166 returns to the position at which it closes the valve, $P_C$ builds up and causes valve 74 to move downwardly to reestablish $P_L$.

In the event that either of the two systems shown in the dual form of my control valve illustrated in FIGURE 2 fails, the corresponding poppet valve 124 seats to permit the other system to operate independently.

It will be seen that I have accomplished the objects of my invention. I have provided an improved pressure control valve for maintaining a constant difference between two variable pressures. My valve has greater control sensitivity than systems heretofore proposed. It incorporates a hydraulic preamplifier so that only a very small signal is required to initiate a control operation. The system has no friction or hysteresis in its first hydraulic stage.

Having thus described my invention, what I claim is:

1. A system for governing the pressure difference between two variable pressures including in combination, a fluid passage having an inlet port and an outlet port and a positionable element movably mounted in said passage for controlling the coupling between said ports, said element being provided with first and second and control areas to which pressures may be applied to position said element, a source of a first variable pressure, means connecting said source to said inlet port to produce a second variable pressure at said outlet port, means for applying said first and second pressures respectively to said first and second areas to urge said element in a direction to reduce the coupling between said ports, a pressure reduction orifice having an inlet and an outlet, means for applying said first pressure to said orifice inlet, an actuatable auxiliary valve, means connecting said auxiliary valve between said orifice outlet and a pressure less than said second pressure, means for actuating said auxiliary valve to provide a control pressure at said orifice outlet and means for applying said control pressure to said control area to urge said element in a direction to increase the coupling between said ports, said first and second areas aggregating less than said control area.

2. A system for governing the pressure difference between two variable pressures including in combination, a fluid passage having an inlet port and an outlet port and a positionable element movably mounted in said passage for controlling the coupling between said ports, a source of a first variable pressure, means connecting said source to said inlet port to provide a second variable pressure at said outlet port, a pressure reduction orifice having an inlet and an outlet, means for applying said first pressure to said orifice inlet, an actuatable auxiliary valve, means connecting said auxiliary valve between said orifice outlet and a pressure less than said second pressure, means for actuating said auxiliary valve to provide a control pressure at said orifice outlet, means for applying said first and second pressures to said element in a direction to reduce the coupling between said ports, and means for applying said control pressure to said element in a direction to increase the coupling between said ports, said auxiliary valve comprising a nozzle between said orifice and said pressure less than second pressure, a main baffle, resilient means normally urging said main baffle toward said nozzle, an auxiliary baffle carried by the main baffle, and means urging said auxiliary baffle to a position at which it normally closes said nozzle, said actuating means comprising signal responsive means for first moving said auxiliary baffle away from said nozzle and then moving said main baffle away from said nozzle to vary said control pressure.

3. A system for governing the pressure difference between two variable pressures including in combination, a fluid passage having an inlet port and an outlet port and a positionable element movably mounted in said passage for controlling the coupling between said ports, a source of a first variable pressure, means connecting said source to said inlet port to provide a second variable pressure at said outlet port, a pressure reduction orifice having an inlet and an outlet, means for applying said first pressure to said orifice inlet, an actuatable auxiliary valve, means connecting said auxiliary valve between said orifice outlet and a pressure less than said second pressure, means for actuating said auxiliary valve to provide a control pressure at said orifice outlet, means for applying said first and second pressures to said element in a direction to reduce the coupling between said ports, means for applying said control pressure to said element in a direction to increase the coupling between said ports, a second fluid passage having an inlet port and an outlet port, a second positionable element movably mounted in said second passage for controlling the coupling between the second passage ports, a second source of a third variable pressure, means for connecting said second source to said second passage inlet port to provide a fourth variable pressure at said second passage outlet port, said pressure less than said second pressure being less than said fourth pressure, means for applying said third and fourth pressures to said second element in a direction to reduce the coupling between said ports, and means for applying said control pressure to said second element in a direction to increase the coupling between said ports.

4. A system as in claim 3 wherein each passage and positionable element comprise a valve and including means for disconnecting one of said passages from said system when said valve is inoperative.

References Cited

UNITED STATES PATENTS

| | | | |
|---|---|---|---|
| 587,786 | 8/1897 | Brown | 251—33 |
| 2,208,737 | 7/1940 | Stewart | 303—21 |
| 2,812,983 | 11/1957 | Bush | 303—21 |
| 2,891,760 | 6/1959 | Dewar | 251—30 X |
| 3,099,499 | 7/1963 | Parshall | 303—210 |
| 3,143,134 | 8/1964 | Karpis | 137—489 X |
| 3,199,927 | 8/1965 | Bidlack et al. | 301—21 |
| 2,502,591 | 4/1950 | Ray | 250—239 |
| 2,587,356 | 2/1952 | McPherson | 137—139 |
| 2,844,158 | 7/1958 | Carson | 137—82 |
| 2,958,503 | 11/1960 | Vaughn | 251—30 |
| 3,021,865 | 2/1962 | Beckett | 137—270 |
| 3,097,664 | 7/1963 | Henley | 137—487 |

OTHER REFERENCES

Ozone Metal Products Corp., Omp 2409–PT 005, Technical Proposal Skid Control Valve; Nov. 4, 1963; pages 1–3, 3A, FIGS. 1 and 2, and page 5.

M. CAREY NELSON, *Primary Examiner.*

R. J. MILLER, *Assistant Examiner.*

U.S. Cl. X.R.

251—30